Patented July 15, 1930

1,770,411

UNITED STATES PATENT OFFICE

FRANS ODD LANDTBLOM, OF STOCKHOLM, SWEDEN, ASSIGNOR TO THE DE LAVAL SEPARATOR COMPANY, OF NEW YORK, N. Y., A CORPORATION OF NEW JERSEY

PROCESS OF PRODUCING WORT

No Drawing. Application filed April 30, 1925, Serial No. 27,059, and in Sweden June 24, 1924.

In an application filed by me June 24, 1924, Serial No. 722,066, I have described a process of making malt for the brewing of malt liquors which comprises removing a large proportion of hulls from the malt, crushing the hulled malt, mashing the crushed malt to form the wort, and applying centrifugal force to recover pure wort freed from solid impurities. In separating the solid impurities, they are carried out of the centrifuge in suspension in a greater or smaller quantity of wort, the latter containing some malt extract; the whole constituting what is hereinafter called "slime." The amount of extract that is contained in this slime is sufficiently great to make it important, or even necessary from an economical standpoint, to work the slime to recover this extract, or the larger proportion thereof.

My invention has for its object to so treat the slime as to recover almost all the extract contained therein. The new process is especially useful as an adjunct to the process for which I have applied for a patent. The new process is not, however, limited to slime produced in this way, or by any other process involving centrifugation, but may be advantageously used to recover extract from slime obtained in any other process of producing wort.

The new process comprises leaching out the extract of the slime to produce a weaker or dilute wort and freeing the slime from this dilute secondary wort by centrifugation. The slime consists of solids suspended in wort containing a comparatively small amount of extract. If it be desired to avoid the loss of this extract, the process of leaching with water and centrifugation may be repeated, thereby separating a still weaker or more dilute tertiary wort from the slime. The ultimate slime consists almost wholly of water and the solid impurities sought to be removed, the proportion of extract in such slime being so inconsiderable as to make it ordinarily uneconomical to subject the slime to further treatment.

In the preferred way of carrying out the process, the slime from the primary relatively concentrated wort is leached with the tertiary wort instead of with water. In other respects, the first described process may be duplicated. That is, the slime is separated from the wort by centrifugation, and this slime is leached with water, followed by another centrifugation. This modified process has the advantage of recovering substantially the same large proportion of extract, while avoiding the use, except for leaching, of wort with a percentage of extract reduced below a suitable value.

In order that my new process may be clearly understood by those skilled in the art, I will give two specific examples. In each case, it is assumed that we start with 10000 kgs. of mash containing 400 kgs. of solids suspended in wort containing 3000 kgs. of extract. It is further assumed that continuously working centrifuges are used in all operations and that these centrifuges are so regulated as to discharge ninety per cent of the quantity fed in as pure wort and ten per cent as slime. It should be further understood that the centrifuges employed are closed bowl centrifuges wherein, under the influence of centrifugal force, the heavier slime is thrown to the periphery while the lighter pure wort is displaced toward the center; these heavier and lighter constituents being continuously discharged from the bowl by separate outlets.

Example I

By centrifugation (or by any other suitable operation) 9000 kgs. of pure wort containing 2700 kgs. of extract are separated from 1000 kgs. of slime containing 300 kgs. of extract and 400 kgs. of solids.

The slime is leached with 9000 kgs. of water, thus producing 10000 kgs. of mash containing 400 kgs. of solids suspended in 9600 kgs. of dilute wort containing 300 kgs. of extract.

This diluted slime is then centrifuged, thus producing 9000 kgs. of pure secondary wort containing 270 kgs. of extract, and 1000 kgs. of slime containing 30 kgs. of extract and 400 kgs. of solids.

The slime is leached with 9000 kgs. of water, thus producing 10000 kgs. of mash containing 400 kgs. of solids suspended in 9600 kgs. of very dilute wort containing 30 kgs. of extract.

This diluted slime is then centrifuged, thus producing 9000 kgs. of pure tertiary wort containing 27 kgs. of extract, and 1000 kgs. of slime containing 3 kgs. of extract and 400 kgs. of solids.

If the process is stopped here, the loss of extract will be 3 kgs. or only one-tenth of one per cent. If the wort obtained by means of the several centrifugation: namely, 9000 kgs. of wort containing 2700 kgs. of extract,
9000 kgs. of wort containing 270 kgs. of extract,
9000 kgs. of wort containing 27 kgs. of extract, be mixed, it will give 27,000 kgs. of wort containing 2997 kgs., or about eleven per cent extract.

Example II

The slime from the first centrifugation is diluted with the 9000 kgs. of wort obtained from the third centrifugation, which contains (as will be understood by the description that follows) 29.7 kgs. of extract. This produces 10000 kgs. of mash containing 400 kgs. of solids suspended in 9600 kgs. of dilute wort containing 329.7 kgs. of extract.

This slime is then centrifuged, thus producing 9000 kgs. of pure secondary wort containing 296.7 kgs. of extract, and 1000 kgs. of slime containing 33 kgs. of extract and 400 kgs. of solids.

This slime is diluted with 9000 kgs. of water, thus producing 10000 kgs. of mash containing 400 kgs. of solids suspended in 9600 kgs. of very dilute wort containing 33 kgs. of extract.

This slime is then centrifuged, thus producing 9000 kgs. of pure tertiary wort containing 29.7 kgs. of extract, and 1000 kgs. of slime containing 3.3 kgs. of extract and 400 kgs. of solids.

If the process be stopped here, the loss of extract will be only 3.3 kgs. or about one-ninth of one per cent. If the primary wort and secondary wort (the product of the first two centrifugations) : namely, 9000 kgs. of wort containing 2700 kgs. of extract,
9000 kgs. of wort containing 296.7 kgs. of extract, be mixed, it will give 18,000 kgs. of wort containing 2996.7 kgs. of extract. The percentage of extract, nearly 18.7 per cent, is materially higher than the percentage of extract in the wort obtained by the process as practiced in accordance with the first example.

Inasmuch as in the first illustrative way of carrying out the process I leach with water preparatory to both centrifugations whereas in the second illustrative way of carrying out the process I leach with a weak or tertiary wort preparatory to the first centrifugation, and inasmuch as I desire to claim both ways of carrying out the process, I have used in the claims the phrase "diluent liquid" to comprehend both water and tertiary wort except in those claims that contain subsequent words of limitation that limit the diluent liquid used in a preceding step to such weak tertiary wort.

Having now fully described my invention, what I claim and desire to protect by Letters Patent is:

1. In that process of producing wort wherein primary wort is separated from slime containing solids suspended in a relatively small proportion of such primary wort, the process of saving the extract in said slime which comprises diluting the slime with a relatively larger volume of a diluent liquid and centrifugally separating a secondary wort containing the larger part of said extract from slime containing said solids and a relatively small proportion of said extract, treating the last named slime by repeating the operation of dilution and centrifugation, utilizing the weak wort separated in a subsequent operation as a diluent for the slime in a preceding operation, and mixing the secondary wort with the primary wort, thereby producing wort with a relatively high percentage of extract while saving all the extract except an inconsiderable proportion.

2. In that process of producing wort wherein primary wort is separated from slime containing solids suspended in a relatively small proportion of such primary wort, the process of saving the extract in said slime which comprises diluting the slime with a relatively larger volume of the tertiary wort hereinafter specified and centrifugally separating a secondary wort containing the larger part of said extract from slime containing said solids and a relatively small proportion of said extract, diluting the last named slime with a relatively larger volume of water and centrifugally separating a tertiary wort containing the larger part of the extract in the last named slime from slime containing said solids and a relatively small proportion of the extract, and mixing the primary wort and the secondary wort, thereby producing wort with a relatively high percentage of extract while saving all except an inconsiderable proportion of the extract.

In testimony of which invention, I have hereunto set my hand at Stockholm, Sweden, on this 16th day of April, 1925.

FRANS ODD LANDTBLOM.